(12) United States Patent
Chen

(10) Patent No.: US 11,522,485 B2
(45) Date of Patent: Dec. 6, 2022

(54) THREE-PHASE MOTOR DRIVING CIRCUIT AND THREE-PHASE MOTOR DRIVING METHOD

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 163 days.

(21) Appl. No.: 17/166,118

(22) Filed: Feb. 3, 2021

(65) Prior Publication Data

US 2022/0140767 A1 May 5, 2022

(30) Foreign Application Priority Data

Oct. 30, 2020 (TW) .................................. 109137845

(51) Int. Cl.
*H02P 27/08* (2006.01)
*H02P 6/15* (2016.01)
*H02P 6/182* (2016.01)

(52) U.S. Cl.
CPC ............ *H02P 27/085* (2013.01); *H02P 27/08* (2013.01); *H02P 6/157* (2016.02); *H02P 6/182* (2013.01)

(58) Field of Classification Search
CPC .......... A61P 31/04; A61P 31/10; C07H 17/08; C12N 9/1029; C12P 19/62; A61K 31/7048; H02P 27/08; H02P 27/085; H02P 6/182; H02P 6/157
USPC ......................................... 318/503; 363/21.01
See application file for complete search history.

(56) References Cited

U.S. PATENT DOCUMENTS

2012/0274293 A1* 11/2012 Ren ...................... H02M 3/1584
323/271
2020/0298722 A1* 9/2020 Smolenaers ............ B60L 53/53

* cited by examiner

*Primary Examiner* — Muhammad S Islam
*Assistant Examiner* — Zemenay T Truneh
(74) *Attorney, Agent, or Firm* — Li & Cai Intellectual Property (USA) Office

(57) ABSTRACT

A three-phase motor driving circuit and a three-phase motor driving method are provided. The three-phase motor driving circuit includes an inverter circuit, a control circuit, a turn-off module, a turn-off confirmation module, and a turn-on logic unit. The inverter circuit includes a plurality of phase circuits, each including an upper bridge switch and a lower bridge switch. The control circuit operates in a feedback mode to output a feedback start signal. The turn-off module includes a feedback detection unit, a voltage adjusting unit, and a turn-off logic unit. The feedback detection unit detects an output current of a designated phase circuit, and if the output current flows out, a voltage regulation signal is output until the output current is 0, and a lower bridge turn-off signal is output. The voltage adjusting unit adjusts the voltage of the output node to be close to a predetermined voltage.

14 Claims, 7 Drawing Sheets

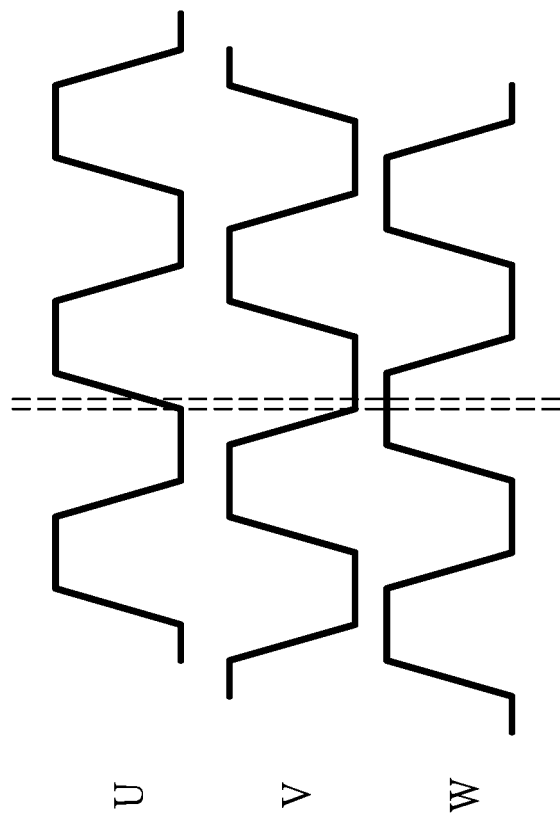
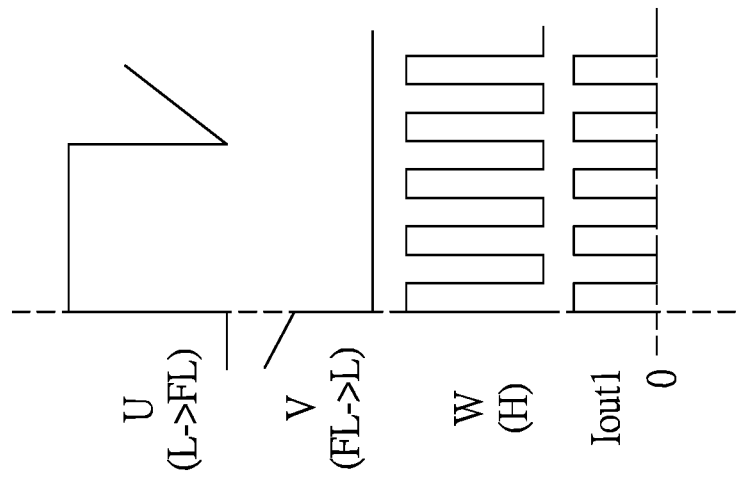
FIG. 3A
FIG. 3B

THREE-PHASE MOTOR DRIVING CIRCUIT AND THREE-PHASE MOTOR DRIVING METHOD

CROSS-REFERENCE TO RELATED PATENT APPLICATION

This application claims the benefit of priority to Taiwan Patent Application No. 109137845, filed on Oct. 30, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a three-phase motor driving circuit and a three-phase motor driving method, and more particularly to a three-phase motor driving circuit and a three-phase motor driving method for preventing a reverse current that flows to a power source.

BACKGROUND OF THE DISCLOSURE

With the advancement of technology, motors have become indispensable electronic devices in the information society. Common motors such as DC motors, AC motors, stepping motors, and the like, have been widely used to drive fans.

The motor includes an upper bridge switch, a lower bridge switch and a drive circuit. A driving circuit is used to control the upper bridge switch and the lower bridge switch to be turned on or off. The upper bridge switch and the lower bridge switch are related to working conditions of the motor. Furthermore, the driving circuit controls the upper bridge switch and the lower bridge switch to be turned on or off to change polarities of a coil of the motor with an output voltage. By utilizing an interaction between the polarities of the coil and polarities of a motor rotor of the motor, the motor rotor will start to rotate due to the polarities of the coil. However, changes of magnetic flux on the coil cause a reverse voltage on a coil connector, which is called back electromotive force.

When the upper bridge switch and the lower bridge switch are alternately switched to drive the motor, and when the upper bridge switch is turned off and the lower bridge switch is turned on, the power supply stops supplying voltage to the motor, such that a voltage of an output node between the upper bridge switch and the lower bridge switch begins to drop. When a switching sequence turns off the lower bridge switch, a current flowing to the node will flow to the power supply, which would cause the voltage to be too high and damage metal-oxide-semiconductor (MOS) switches.

In practice, a protective Zener diode and a protective capacitor are inserted between the power supply and the motor driver to prevent the reverse current in the motor from flowing back to the power supply, thereby suppressing a power supply voltage (VCC) to protect the power switch.

SUMMARY OF THE DISCLOSURE

In response to the above-referenced technical inadequacies, the present disclosure provides a three-phase motor driving circuit and a three-phase motor driving method for preventing a reverse current that flows to a power source.

In one aspect, the present disclosure provides a three-phase motor driving circuit for driving a motor, and the three-phase motor driving circuit includes an inverter circuit, a control circuit, a turn-off module, a turn-off confirmation module and a turn-on logic unit. The inverter circuit includes a plurality of phase circuits, each corresponding to a plurality of phase windings of the motor, and each of the plurality of phase circuits includes an upper bridge switch and a lower bridge switch. The upper bridge switch is connected between a common voltage source and an output node, and the common voltage source has a predetermined voltage. The lower bridge switch is connected between the output node and a ground terminal. The control circuit receives an upper bridge switch driving signal and a lower bridge switch driving signal, and is configured to operate in a normal mode and a feedback mode. In response to the control circuit receiving the lower bridge switch driving signal indicating that the lower bridge switch of a designated phase circuit among the plurality of phase circuits to be switched from on to off and a feedback control signal indicating the control circuit to enter the feedback mode, the control circuit is configured to enter the feedback mode and output a feedback start signal. The turn-off module includes a feedback detection unit, a voltage adjusting unit, and a turn-off logic unit. The feedback detection unit is configured to, in response to receiving the feedback start signal, detect an output current of the output node of the designated phase circuit. If the output current is indicated to be flowing to the upper bridge switch, the feedback detection unit outputs a voltage regulation signal to adjust a voltage of the output node to approach the predetermined voltage, and outputs a lower bridge turn off signal when the output current stops flowing to the upper bridge switch. The voltage adjusting unit is configured to, in response to receiving the voltage adjusting signal, adjust the voltage of the output node to approach the predetermined voltage. The turn-off logic unit is configured to control the lower bridge switch to be turned off according to the lower bridge turn off signal in the feedback mode. The turn-off confirmation module is configured to detect whether the lower bridge switch is turned off, and to output, in response to detecting that the lower bridge switch is turned off, a lower bridge switch turn-off confirmation signal used to indicate allowing the control circuit to control the upper bridge switch to be turned on. The turn-on logic unit is configured to control the lower bridge switch to be turned on according to a lower bridge switch turn on signal. In the feedback mode, the control circuit is configured to control the upper bridge switch to be turned on according to an upper bridge switch driving signal in response to receiving the lower bridge switch turn-off confirmation signal.

In some embodiments, the three-phase motor driving circuit further includes a mode driving circuit, which outputs the upper bridge switch driving signal, the lower bridge switch driving signal and the feedback control signal according to a predetermined driving pattern. The predetermined driving pattern has a commutation sequence for driving the plurality of phases of the motor.

In some embodiments, the commutation sequence is used to instruct the plurality of phase windings of the motor to enter a high potential mode, a low potential mode, and a floating mode respectively. When one of the phase windings enters the floating mode from the low potential mode by an instruction of the commutation sequence, the mode driving circuit indicates the phase winding that enters the floating mode from the low potential mode as a designated phase windings corresponding to the designated phase circuit, and when the lower bridge switch driving signal output by the mode driving circuit indicates that the lower bridge switch of the designated phase circuit is switched from on to off, the feedback control signal is correspondingly output to instruct the control circuit to enter the feedback mode.

In some embodiments, the control circuit directly controls the upper bridge switch and the lower bridge switch to be turned on or off according to the upper bridge switch driving signal and the lower bridge switch driving signal in the normal mode.

In some embodiments, the commutation sequence is used to indicate that the output nodes of the plurality of phase circuits corresponding to the plurality of phase windings of the motor respectively enter a predicted source current state and a predicted sink current state in sequence.

In some embodiments, when one of the output nodes of the phase circuits enters the predicted source current state according to the instruction of the commutation sequence, the mode driving circuit indicates the phase circuit whose output node enters the predicted source current state as the designated phase circuit, and when the lower bridge switch driving signal output by the mode driving circuit instructs the lower bridge switch of the designated phase circuit to be switched from on to off, the feedback control signal is correspondingly output to instruct the control circuit to enter the feedback mode.

In some embodiments, when one of the output nodes of the phase circuits makes the corresponding phase circuits to respectively enter the predicted source current state according to the instruction of the commutation sequence, the mode driving circuit indicates the phase circuit entering the predicted source current state as the designated phase circuit. When the lower bridge switch driving signal output by the mode driving circuit instructs the lower bridge switch of the designated phase circuit to be switched from on to off, the feedback control signal is correspondingly output to instruct the control circuit to enter the feedback mode, and when the feedback detection unit detects that the output current is 0 and outputs the lower bridge switch turn-off signal, stops an output of the feedback control signal is stopped to instruct the control circuit to return to the normal mode.

In another aspect, the present disclosure provides a three-phase motor driving method, which is suitable for a three-phase motor driving circuit and is configured to drive a motor. The three-phase motor driving circuit includes an inverter circuit, a control circuit, a turn-off module, a turn-off confirmation module, and a turn-on logic unit. The inverter circuit includes a plurality of phase circuits respectively corresponding to a plurality of phase windings of the motor. Each of the phase circuits includes an upper bridge switch connected between a common voltage source and an output node, and a lower bridge switch connected between the output node and a ground terminal. The three-phase motor driving method includes: configuring a control circuit to receive an upper bridge switch driving signal and a lower bridge switch driving signal and operate in a normal mode and a feedback mode, and enter the feedback mode and output a feedback start signal in response to the control circuit receiving the lower bridge switch driving signal indicating that the lower bridge switch of a designated phase circuit among the plurality of phase circuits to be switched from on to off and a feedback control signal indicating that the control circuit to enter the feedback mode; configuring a feedback detection unit to, in response to receiving the feedback start signal, detect an output current of the output node of the designated phase circuit, in which if the output current is flowing to the upper bridge switch, configuring the feedback detection unit to output a voltage regulation signal to adjust a voltage of the output node to approach the predetermined voltage, and output a lower bridge turn off signal until the output current stops flowing to the upper bridge switch; configuring a voltage adjusting unit to, in response to receiving the voltage adjusting signal, adjust the voltage of the output node to approach the predetermined voltage; configuring a turn-off logic unit to control the lower bridge switch to be turned off according to the lower bridge turn off signal in the feedback mode; configuring a turn-off confirmation module to detect whether the lower bridge switch is turned off, and output, in response to detecting that the lower bridge switch is turned off, a lower bridge switch turn-off confirmation signal used to indicate allowing the control circuit to control the upper bridge switch to be turned on; configuring a turn-on logic unit to control the lower bridge switch to be turned on according to a lower bridge switch turn-on signal; and configuring the control circuit to, in the feedback mode, control the upper bridge switch to be turned on according to an upper bridge switch driving signal in response to receiving the lower bridge switch turn-off confirmation signal.

Therefore, the three-phase motor driving circuit and the three-phase motor driving method provided by the present disclosure adjust the voltage of the output node to a power supply voltage in the feedback mode, which can prevent the reverse current generated by the motor due to sequential action from having an opportunity to flow back to the voltage source through the upper bridge switch and cause damage when the motor is driven to rotate.

On the other hand, the three-phase motor driving circuit and the three-phase motor driving method provided by the present disclosure can enable the feedback mode during a specific period in a motor driving sequence to avoid a feedback detection when the output node enters the sink current state. Therefore, an increase in power consumption of the motor can be further avoided.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 3A is a timing diagram of back electromotive force voltages of U-phase winding U, V-phase winding V, or W-phase winding W of a motor 11 according to an embodiment of the present disclosure;

FIG. 3B is an enlarged view of FIG. 3A and a current timing diagram of an output node;

DETAILED DESCRIPTION OF THE EXEMPLARY EMBODIMENTS

Figure 1A:
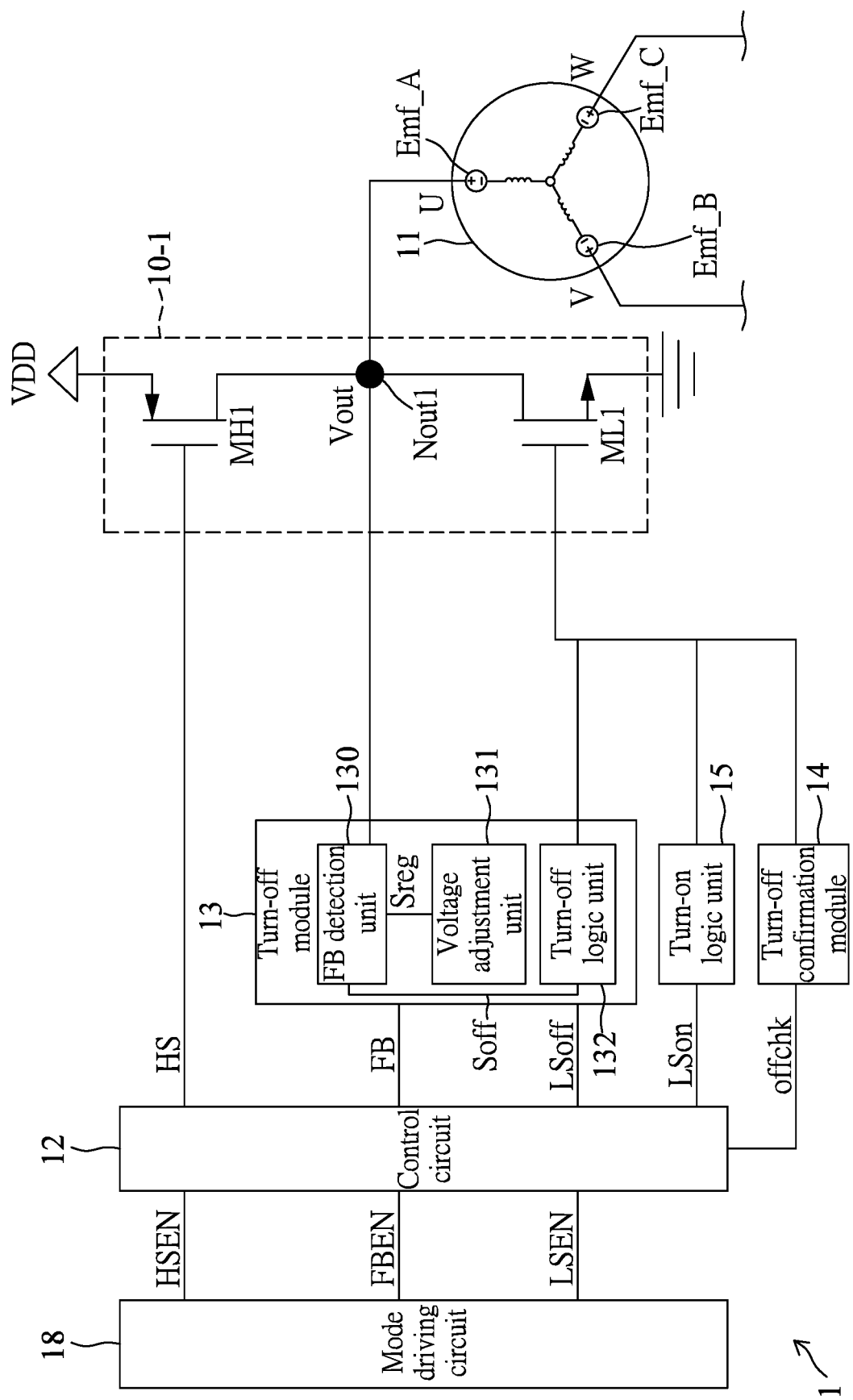
FIG. 1A is a circuit structure diagram of a three-phase motor driving circuit according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
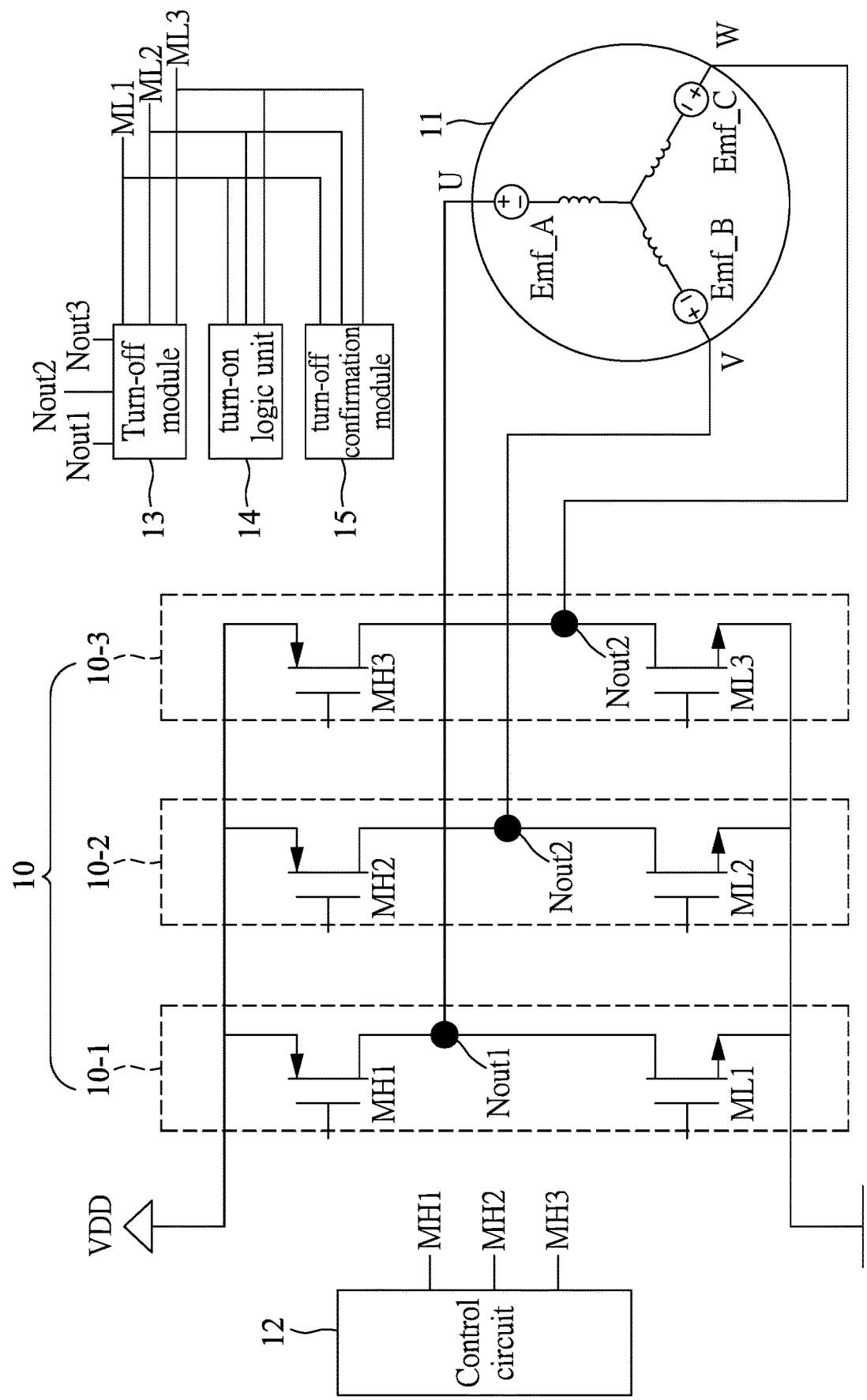
FIG. 2 is a circuit structure diagram of a motor, a control circuit, a turn-off module, a turn-on logic unit, and a turn-off confirmation module according to an embodiment of the present disclosure.

FIG. 1A is a circuit structure diagram of a three-phase motor driving circuit according to an embodiment of the present disclosure, and FIG. 2 is a circuit structure diagram of a motor, a control circuit, a turn-off module, a turn-on logic unit, and a turn-off confirmation module according to an embodiment of the present disclosure.

Reference is made to FIG. 1A and FIG. 2, an embodiment of the present invention provides a three-phase motor driving circuit 1 for driving a motor 11. The three-phase motor driving circuit 1 includes an inverter circuit 10, a control circuit 12, a turn-off module 13, a turn-off confirmation module 14, a turn-on logic unit 15 and a mode driving circuit 18.

The inverter circuit 10 includes phase circuits 10-1, 10-2, and 10-3 respectively corresponding to a U-phase winding U, a V-phase winding V, and a W-phase winding W of the motor 11. The phase circuit 10-1 includes an upper bridge switch MH1 and a lower bridge switch ML1, the phase circuit 10-2 includes an upper bridge switch MH2 and a lower bridge switch ML2, and the phase circuit 10-3 includes an upper bridge switch MH3 and a lower bridge switch ML3.

For the phase circuit 10-1, the upper bridge switch MH1 is connected between a common voltage source VDD and an output node Nout1, and the common voltage source VDD has a predetermined voltage VM. The lower bridge switch ML1 is connected between the output node Nout1 and a ground terminal. Similarly, the phase circuits 10-2 and 10-3 have structures similar to that of the phase circuit 10-1, in which the upper bridge switch MH2 is connected to the lower bridge switch ML2 through an output node Nout2, and the upper bridge switch MH3 is connected to the lower bridge switch ML3 through an output node Nout3.

Generally speaking, the motor 11 has three phase windings, namely the U-phase winding U, the V-phase winding V, and the W-phase winding W. As can be seen from the circuit structure of FIG. 2, the inverter circuit 10 includes the upper bridge switches MH1, MH2, MH3 and the lower bridge switches ML1, ML2, ML3. When the upper bridge switch MH1 and the lower bridge switch ML2 are turned on, the current generated by the operating motor flows from a power terminal through the upper bridge switch MH1, the U-phase winding U, the V-phase winding V of the motor 11, and then through the lower bridge switch ML2 to the ground terminal.

Generally, the currents for controlling a normal motor flow from the U-phase winding to the V coil winding, and the U coil winding to the W coil winding. Then, the currents are changed to flow from the V coil winding to the W coil winding, the V coil winding to the U coil winding, and the V coil winding to the W coil winding. Next, other phase changes continuously control a flow direction of the currents of the U coil winding, the V coil winding, and the W coil winding, thereby controlling a rotational direction of the motor 11. The phase change of the motor 11 is described as above; however, this is only one kind of phase changing control for the motor 11, and other phase changing methods for a motor will not be described herein.

Furthermore, a commutation sequence can be, for example, UV, UW, VW, VU, WU, and WV arranged in sequence. When the U coil winding serves as the floating phase, a back electromotive force (BEMF) generated thereby is Emf_A, when the V coil winding V serves as the floating phase, a BEMF generated thereby is Emf_B, and when the W coil winding W serves as the floating phase, a BEMF generated thereby is Emf_C.

Before describing the mechanism of the control circuit 12, first, the mode driving circuit 18 shown in FIG. 1A will be described. The mode driving circuit 18 is configured to output an upper bridge switch driving signal HSEN, a lower bridge switch driving signal LSEN, and a feedback control signal FBEN according to a predetermined driving pattern. In detail, the predetermined driving pattern has a commutation sequence for driving the U-phase winding U, V-phase winding V, and W-phase winding W of the motor 11, for example, the above-mentioned sequence of UV, UW, VW, VU, WU and WV. The mode driving circuit 18 can, according to this commutation sequence, generate and output the corresponding upper bridge switch driving signal HSEN, the lower bridge switch driving signal LSEN, and the feedback control signal FBEN.

For example, the mode driving circuit 18 can include a PWM driving circuit. When a speed control of the motor 11 is performed, a PWM signal can be generated as the above-mentioned upper bridge switch driving signal HSEN and the lower bridge switch driving signal LSEN, thereby controlling the upper bridge switches MH1, MH2, MH3 and the lower bridge switches ML1, ML2, ML3. In this case, a duty cycle of the PWM signal is positively proportional to an average voltage given to the motor 11, such that a rotational speed of the motor 11 can be further controlled.

In further detail, during a process of the mode driving circuit 18 driving the motor 11, the feedback control signal FBEN can be used to instruct the control circuit 12 whether to enter the feedback mode from the normal mode, so as to detect a voltage of an output node of a designated phase circuit at a specific time, which will be further explained below.

The control circuit 12 can be configured to receive the upper bridge switch driving signal HSEN and the lower bridge switch driving signal LSEN, and operate in a normal mode and a feedback mode. In the normal mode, the control circuit 12 directly generates an upper bridge switch signal HS according to the upper bridge switch driving signal HSEN to control the corresponding upper bridge switch (for example, the upper bridge switch MH1), and controls the corresponding lower bridge switch (for example, the low-bridge switch ML1) to be turned on or off according to the lower bridge switch driving signal LSEN.

In the embodiment of the present disclosure, when the lower bridge switch driving signal LSEN received by the control circuit 12 indicates that the lower bridge switch of a designated phase circuit of the phase circuits 10-1, 10-2, and 10-3 is switched from on to off, and when the control circuit 12 receives the feedback control signal FBEN indicating the control circuit 12 to enter the feedback mode, the control circuit 12 enters the feedback mode to output a feedback start signal FB. For example, when the designated phase circuit is the phase circuit 10-1, the received lower bridge switch driving signal LSEN indicates that the lower bridge switch ML1 of the phase circuit 10-1 is switched from on to off, and when the control circuit 12 receives the feedback control signal FBEN instructing to enter the feedback mode, the control circuit 12 enters the feedback mode to output the feedback start signal FB to indicate that a feedback detection needs to be performed on the output node Nout1 of the phase circuit 10-1 corresponding to the U-phase winding U.

The turn-off module 13 includes a feedback detection unit 130, a voltage adjusting unit 131 and a turn-off logic unit 132. The feedback detection unit 130 is configured to, in response to receiving the feedback start signal FB, detect an output current of the output node of the designated phase circuit. For example, if the designated phase circuit is the phase circuit 10-1, the feedback detection unit 130 detects the output current of the output node Nout1 of the phase circuit 10-1 in response to receiving the feedback activation signal FB.

If the detected output current indicates that the output current flows from the output node Nout1 to the upper bridge switch MH1 (for example, if the output current is less than 0), a voltage regulation signal Sreg is output. When the output current stops flowing to the upper bridge switch MH1 (for example, when the output current is 0), an output of the voltage regulation signal Sreg is stopped, and a lower bridge turn-off signal Soff is output instead. The voltage adjusting unit 131 is configured to, in response to receiving the voltage regulation signal Sreg, adjust the voltage Vout of the output node Nout to approach the predetermined voltage VM.

Figure 1B:
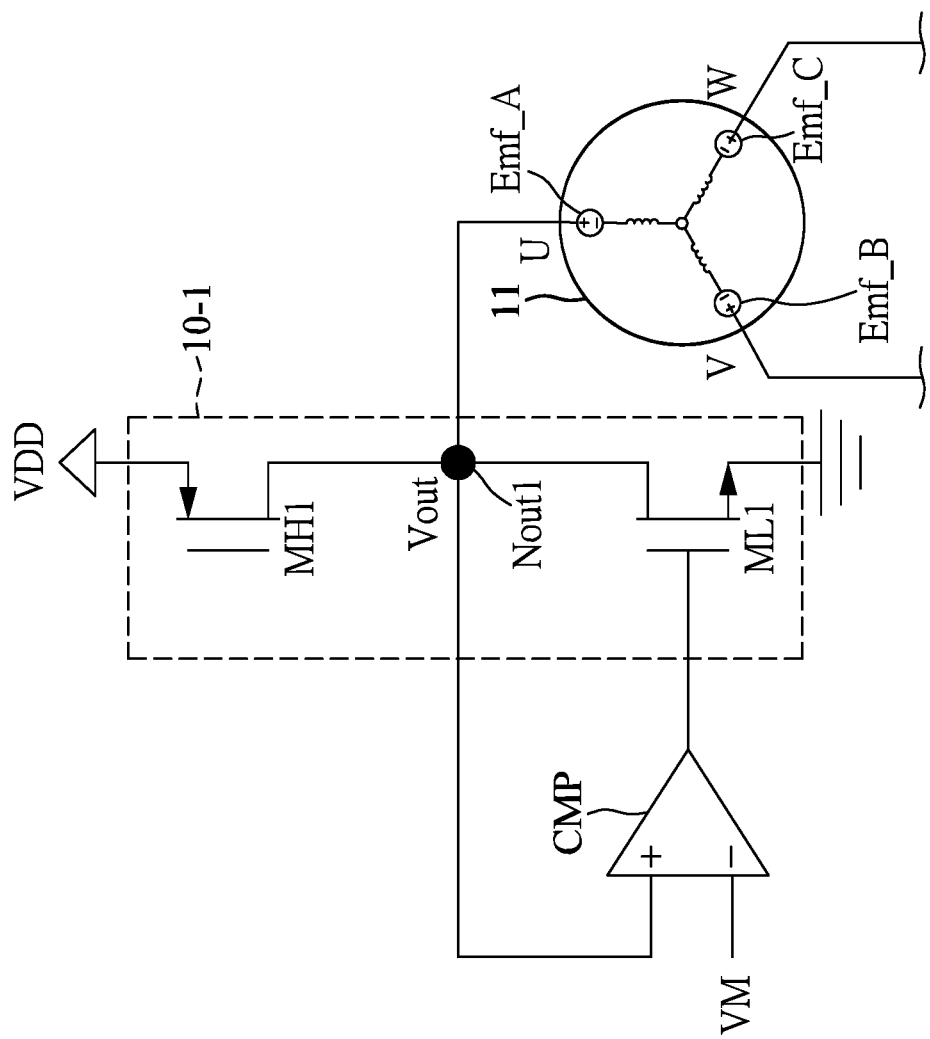
FIG. 1B is a schematic circuit diagram of a feedback detection unit and a voltage adjusting unit according to an embodiment of the present disclosure.

In some embodiments, the output current can be detected by detecting the voltage Vout of the output node Nout1. For example, reference can be made to FIG. 1B, which is a schematic circuit diagram of a feedback detection unit and a voltage adjusting unit according to an embodiment of the present disclosure. As shown in FIG. 1B, functions of the feedback detection unit 130 and the voltage adjusting unit 131 can be realized by setting a comparator CMP. When the output current flows to the upper bridge switch MH1 (for example, the output current being a negative value), the voltage Vout will be adjusted by the comparator CMP to a potential close to the predetermined voltage VM, and when the output current stops flowing to the upper bridge switch MH1 (for example, the output current being a positive value), the voltage Vout drops to 0V since the comparator CMP is not triggered. Therefore, the direction that the output current flows can be detected and automatically adjusted accordingly.

The turn-off logic unit 132 is configured to generate a lower bridge switch turn-off signal Lsoff according to the lower bridge switch turn-off signal Soff in the feedback mode to control the lower bridge switch to be turned off.

The turn-off confirmation module 14 is configured to detect whether the lower bridge switch ML1 is switched off, and output, in response to detecting that the lower bridge switch ML1 is switched to off, a lower bridge switch turn-off confirmation signal Offchk used to indicate allowing the control circuit 12 to control the upper bridge switch MH1 to be turned on.

The turn-on logic unit 15 is configured to control the lower bridge switch ML1 to be turned on according to a lower bridge switch turn-on signal LSon. In the feedback mode, the control circuit 12 is configured to control the upper bridge switch to be turned on according to the upper bridge switch driving signal HSEN in response to receiving the lower bridge switch turn-off confirmation signal Offchk.

The mode driving circuit 18 can activate the feedback mode at a specific time point to detect the voltage of the output node of a designated phase circuit. The specific time point can be, for example, when the U-phase winding U, V-phase winding V, or W-phase winding W of the motor 11 enters a floating mode FL from a low potential mode L.

Referring to FIGS. 3A and 3B, FIG. 3A is a timing diagram of back electromotive force voltages of U-phase winding U, V-phase winding V, or W-phase winding W of the motor 11 according to an embodiment of the present disclosure, and FIG. 3B is an enlarged view of FIG. 3A and a current timing diagram of the output node.

In detail, the aforementioned commutation sequence can be used to instruct the U-phase winding U, V-phase winding V, and W-phase winding W of the motor 11 to enter a high potential mode H, the low potential mode L, and the floating mode FL, respectively. When one of the U-phase winding U, V-phase winding V, and W-phase winding W enters the floating mode FL from the low potential mode L according to an instruction of the commutation sequence, the mode driving circuit 18 indicates the phase winding that enters the floating mode FL from the low potential mode L as a designated phase corresponding to the designated phase circuit.

In this case, when the lower bridge switch driving signal LSEN output by the mode driving circuit 18 indicates that the lower bridge switch of the designated phase circuit is switched from on to off, the feedback is activated, that is, the feedback control signal FBEN indicating the control circuit 12 enters the feedback mode is correspondingly output. For example, the feedback control signal FBEN may be the feedback control signal FBEN with a high potential.

Figure 4:
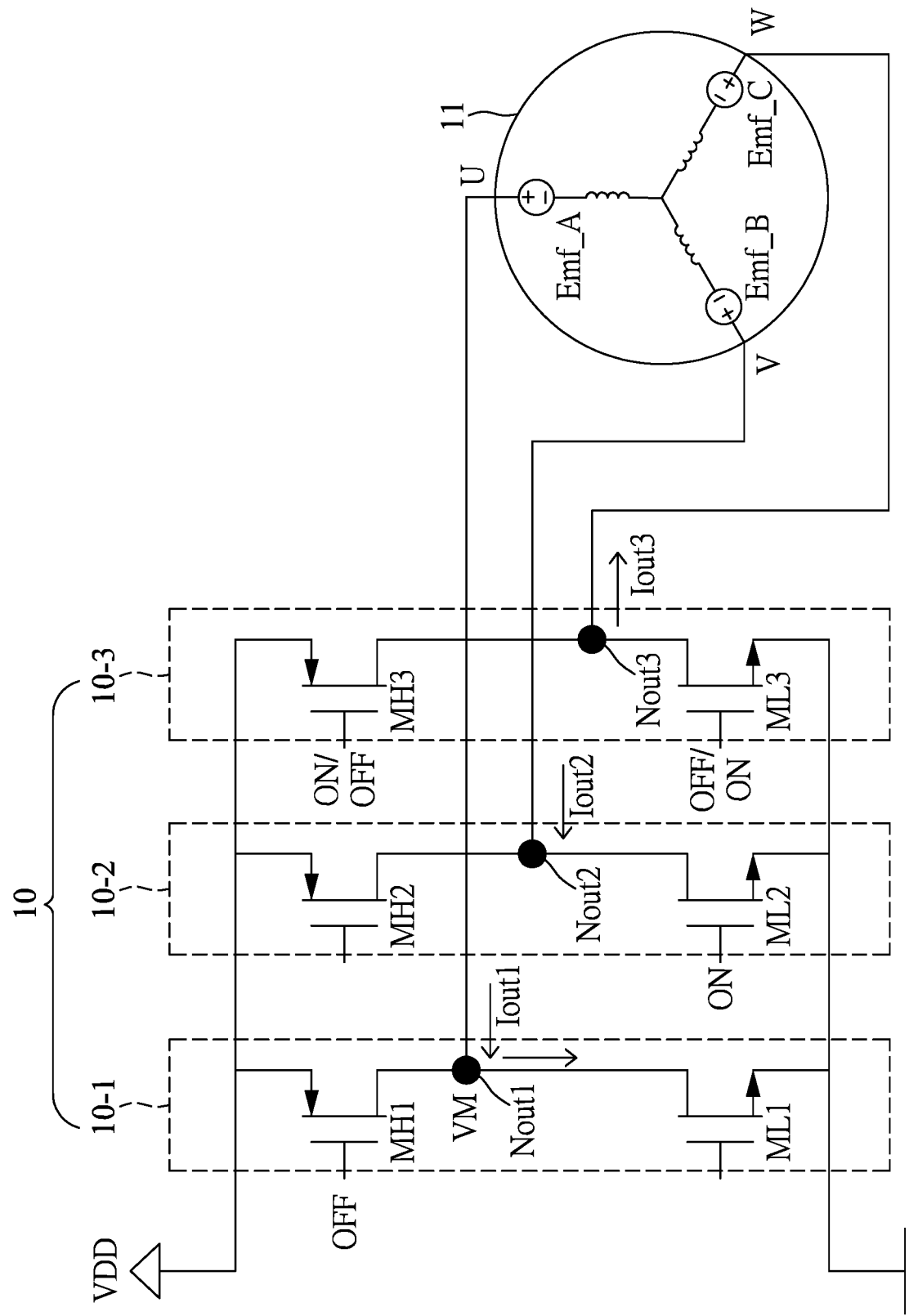
FIG. 4 is a schematic diagram showing a phase circuit and the motor when the U-phase winding enters a floating mode from a low potential mode according to an embodiment of the present disclosure.

For example, assuming that a current time falls within an interval defined by the broken lines in FIG. 3A, since the U-phase winding U enters the floating mode FL from the low potential mode L, the designated phase winding is the U-phase winding U. Further, reference is made to FIG. 4, which is a schematic diagram showing a phase circuit and a motor when the U-phase winding U enters the floating mode FL from the low potential mode L according to an embodiment of the present disclosure. It can be seen that the back electromotive force Emf_A generated on the U-phase winding U is at a high potential, and an output current Iout1 flowing out of the output node Nout1 will be generated. Directions of output currents Iout2 and Iout3 respectively relative to the output nodes Nout2 and Nout3 are shown in FIG. 3A.

At this time, since the upper bridge switch MH1 is turned off, if the voltage of the output node Nout1 is not adjusted, a reverse current flowing to the common voltage source VDD may be generated. However, since the U-phase winding U enters the floating mode FL from the low potential mode L, the mode driving circuit 18 outputs the feedback control signal FBEN instructing the control circuit 12 to enter the feedback mode, and in response to receiving the feedback control signal FBEN, the control circuit 12 enters the feedback mode and outputs the feedback start signal FB at this time.

Next, the feedback detection unit 130 detects the output current Iout1 of the output node Nout1 of the designated phase circuit (U-phase winding U) in response to receiving the feedback start signal FB.

At this time, the feedback detection unit 130 will detect that the output current Iout1 is flowing out of the output node Nout1 (for example, if the output current is detected to be less than 0), and the feedback detection unit 130 outputs the voltage regulation signal Sreg. The voltage adjusting unit 131 is configured to, in response to receiving the voltage regulation signal Sreg, adjust the voltage Vout of the output node Nout1 to approach the predetermined voltage VM, such that an inductor current of the U-phase winding U flows out of the lower bridge switch ML1 during the adjustment and gradually decays until the output current Iout1 reaches zero.

When the output current Iout1 reaches 0, the feedback detection unit 130 stops outputting the voltage regulation signal Sreg, and instead outputs the lower bridge switch turn-off signal Soff. The turn-off logic unit 132 controls the low-bridge switch ML1 to be turned off according to the lower bridge switch turn-off signal Soff.

At the same time, in response to the lower bridge switch ML1 being switched to off, the turn-off confirmation module 14 detects that the lower bridge switch ML1 is switched off, and outputs the lower bridge turn-off confirmation signal Offchk to indicate that the control circuit 12 is allowed to control the upper bridge switch MH1 to be turned on.

Since the above process occurs when the lower bridge switch control signal LSEN instructs the lower bridge switch ML1 to switch from on to off, and the upper bridge switch control signal HSEN is theoretically opposite to the lower bridge switch control signal LSEN, it can be seen that the upper bridge switch control signal HSEN will instruct the upper bridge switch MH1 to be switched from off to on. Therefore, when the control circuit 12 receives the upper bridge switch control signal HSEN instructing to switch the upper bridge switch MH1 from off to on, the control circuit 12 controls the upper bridge switch MH1 to be turned on after receiving the lower bridge switch turn-off confirmation signal Offchk. In this way, switching cycles are performed.

Figure 5:
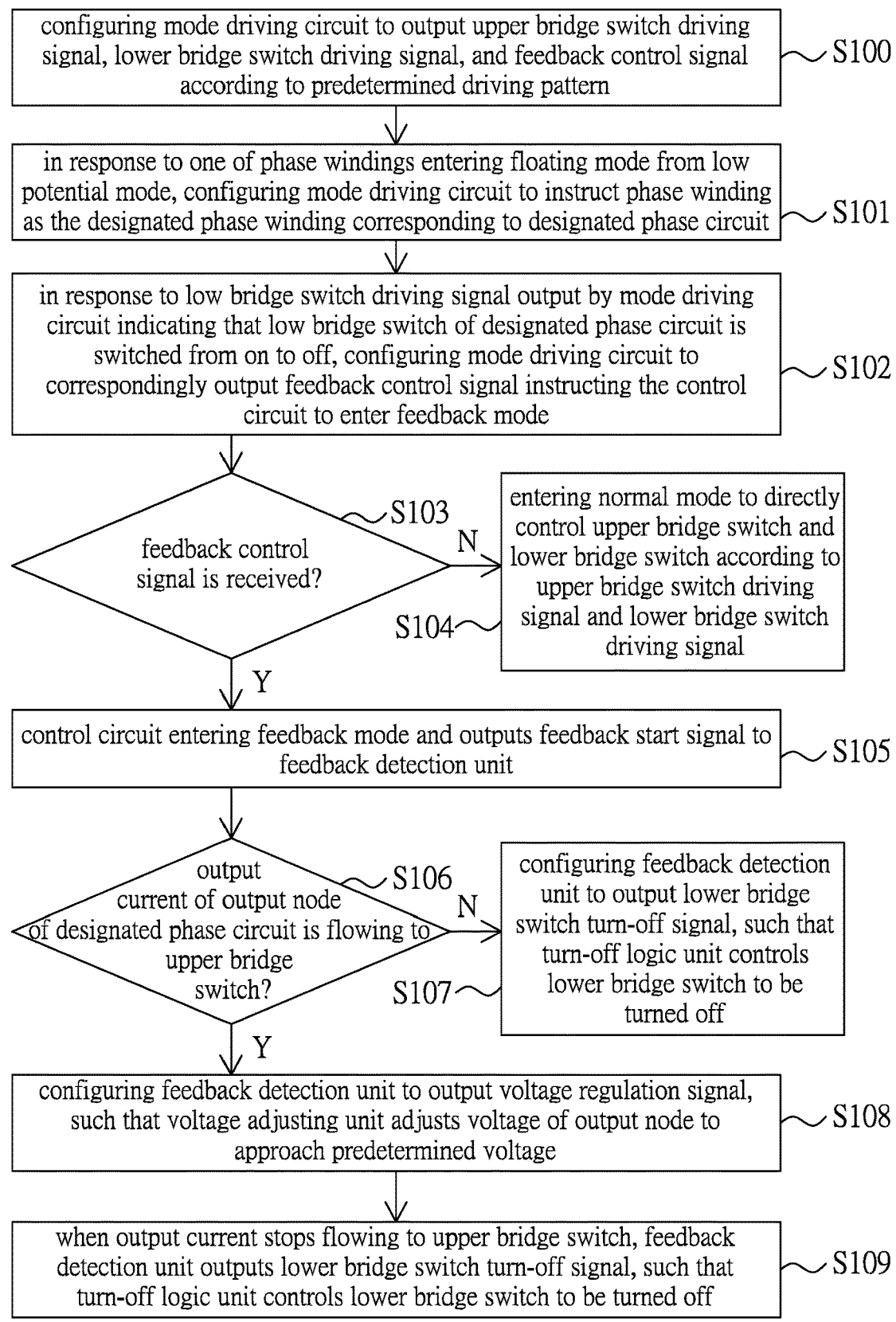
FIG. 5 is a flowchart of a three-phase motor driving method according to an embodiment of the present disclosure.

According to the above process, an embodiment of the present disclosure also provides a three-phase motor driving method, which is suitable for the three-phase motor driving circuit in the above embodiment. Reference is made to FIG. 5, which is a flowchart of a three-phase motor driving method according to an embodiment of the present disclosure.

As shown in FIG. 5, the three-phase motor driving method may include the following steps:

Step S100: configuring the mode driving circuit to output the upper bridge switch driving signal, the lower bridge switch driving signal, and the feedback control signal according to the predetermined driving pattern.

Step S101: in response to one of the plurality of phase windings entering the floating mode from the low potential mode, configuring the mode driving circuit to instruct the phase winding as the designated phase winding corresponding to the designated phase circuit.

Step S102: in response to the low bridge switch driving signal output by the mode driving circuit indicating that the low bridge switch of the designated phase circuit is switched from on to off, configuring the mode driving circuit to correspondingly output a feedback control signal instructing the control circuit to enter the feedback mode.

Step S103: configuring the control circuit to determine whether the feedback control signal instructing to enter the feedback mode is received. If not, the method proceeds to step S104, and the control circuit enters the normal mode to directly control the upper bridge switch and the lower bridge switch according to the upper bridge switch driving signal and the lower bridge switch driving signal.

If so, the method proceeds to step S105, and the control circuit enters the feedback mode and outputs the feedback start signal to the feedback detection unit.

In response to the feedback detection unit receiving the feedback start signal, the method proceeds to step S106: configuring the feedback detection unit to detect whether the output current of the output node of the designated phase circuit is flowing to the upper bridge switch.

If not, the method proceeds to step S107: configuring the feedback detection unit to output the lower bridge switch turn-off signal, such that the turn-off logic unit controls the lower bridge switch to be turned off.

If yes, the method proceeds to step S108: configuring the feedback detection unit to output the voltage regulation signal, such that the voltage adjusting unit adjusts the voltage of the output node to approach the predetermined voltage.

Step S109: when the output current stops flowing to the upper bridge switch, the feedback detection unit outputs the lower bridge switch turn-off signal, such that the turn-off logic unit controls the lower bridge switch to be turned off.

Afterward, the turn-off confirmation module detects that the lower bridge switch is turned off, and outputs a lower bridge switch turn-off confirmation signal to indicate that the control circuit is allowed to control the upper bridge switch to be turned on.

Therefore, the three-phase motor driving circuit and the three-phase motor driving method can enable the feedback mode to adjust the voltage of the output node of the corresponding phase circuit when the phase winding of the motor enters the floating mode from the low potential mode and becomes the designated phase winding during a motor driving sequence, which can avoid that the reverse current generated by the motor due to sequential action has an opportunity to flow back to the voltage source through the upper bridge switch when the motor is driven and rotated.

Figure 6:
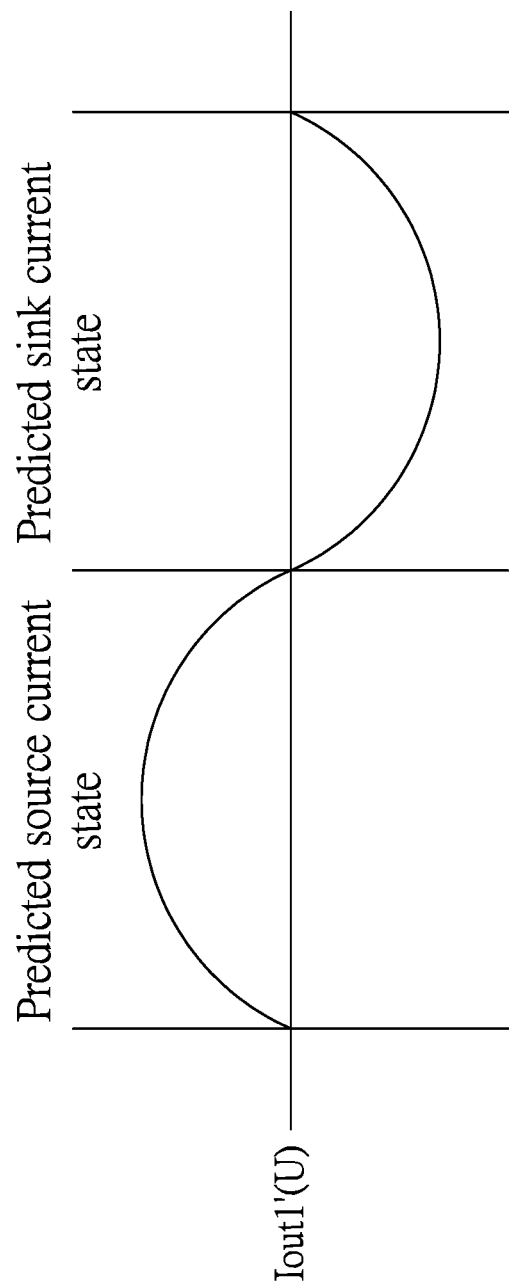
FIG. 6 is a timing diagram showing a predicted current of an output node according to another embodiment of the present disclosure.

It should be noted that the aforementioned predetermined driving pattern can be designed by a user. Therefore, it is expected that the commutation sequence adopted by the predetermined driving pattern can be used to indicate that the output nodes of the phase circuits corresponding to the phase windings of the motor 11 respectively enter a predicted source current state and a predicted sink current state in sequence. Further reference can be made to FIG. 6, which is a timing diagram showing a predicted current of an output node according to another embodiment of the present disclosure. Taking the phase circuit 10-1 corresponding to the U-phase winding U as an example, FIG. 6 shows a predicted current Iout1' that may be generated when the output node Nout1 enters the predicted source current state and the predicted sink current state.

Under this premise, when one of the output nodes of the phase circuits enters the predicted source current state according to the instruction of the commutation sequence, the mode driving circuit 18 indicates the phase circuit whose output node enters the predicted source current state as the designated phase circuit, and when the lower bridge switch driving signal LSEN output by the mode driving circuit 18 instructs the lower bridge switch of the designated phase circuit to be switched from on to off, the feedback control signal FBEN is correspondingly output to instruct the control circuit 12 to enter the feedback mode.

In an exemplary embodiment, the mode driving circuit 18 can be further configured to, until the feedback detection unit 130 detects that the output current is 0 and the lower bridge switch turn-off signal is output, stop outputting the feedback control signal FBEN to instruct the control circuit 12 to return to the normal mode.

In other words, the difference from the previous embodiment is only that the time point as to when the mode driving circuit 18 instructs the control circuit 12 to enter the feedback mode is slightly different, but basically the feedback mode is activated to adjust the voltage of the output node of the corresponding phase circuit, thereby preventing the reverse current generated by the motor due to sequential action has an opportunity to flow back to the voltage source through the upper bridge switch when the motor is driven and rotated.

It should be noted that although the embodiment of the present disclosure controls the lower bridge switch, it is conceivable that after entering the feedback mode, the output current of the output node can be detected, and then the upper bridge switch is controlled to achieve the same effect, which will not be reiterated herein.

In conclusion, the three-phase motor driving circuit and the three-phase motor driving method provided by the present disclosure adjust the voltage of the output node to a power supply voltage in the feedback mode, which can prevent the reverse current generated by the motor due to sequential action from having an opportunity to flow back to the voltage source through the upper bridge switch and cause damage when the motor is driven to rotate.

On the other hand, the three-phase motor driving circuit and the three-phase motor driving method provided by the present disclosure can enable the feedback mode during a specific period in a motor driving sequence to avoid a feedback detection when the output node enters the sink current state. Therefore, an increase in power consumption of the motor can be further avoided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A three-phase motor driving circuit for driving a motor, comprising:
   an inverter circuit including a plurality of phase circuits, each corresponding to a plurality of phase windings of the motor, wherein each of the plurality of phase circuits includes:
      an upper bridge switch connected between a common voltage source and an output node, wherein the common voltage source has a predetermined voltage; and
      a lower bridge switch connected between the output node and a ground terminal;
   a control circuit receiving an upper bridge switch driving signal and a lower bridge switch driving signal, and configured to operate in a normal mode and a feedback mode, wherein in response to the control circuit receiving the lower bridge switch driving signal indicating that the lower bridge switch of a designated phase circuit among the plurality of phase circuits to be switched from on to off and a feedback control signal indicating the control circuit to enter the feedback mode, the control circuit is configured to enter the feedback mode and output a feedback start signal;
   a turn-off module, including:
      a feedback detection unit configured to, in response to receiving the feedback start signal, detect an output current of the output node of the designated phase circuit, wherein, if the output current is indicated to be flowing to the upper bridge switch, the feedback detection unit outputs a voltage regulation signal to adjust a voltage of the output node to approach the predetermined voltage, and outputs a lower bridge turn off signal when the output current stops flowing to the upper bridge switch;
      a voltage adjusting unit configured to, in response to receiving the voltage adjusting signal, adjust the voltage of the output node to approach the predetermined voltage; and
      a turn-off logic unit configured to control the lower bridge switch to be turned off according to the lower bridge turn off signal in the feedback mode;
   a turn-off confirmation module, configured to detect whether the lower bridge switch is turned off, and to output, in response to detecting that the lower bridge switch is turned off, a lower bridge switch turn-off confirmation signal used to indicate allowing the control circuit to control the upper bridge switch to be turned on; and
   a turn-on logic unit configured to control the lower bridge switch to be turned on according to a lower bridge switch turn on signal,
   wherein in the feedback mode, the control circuit is configured to control the upper bridge switch to be turned on according to the upper bridge switch driving signal in response to receiving the lower bridge switch turn-off confirmation signal.

2. The three-phase motor driving circuit according to claim 1, further comprising a mode driving circuit that outputs the upper bridge switch driving signal, the lower bridge switch driving signal and the feedback control signal according to a predetermined driving pattern, wherein the predetermined driving pattern has a commutation sequence for driving the plurality of phases of the motor.

3. The three-phase motor driving circuit according to claim 2, wherein the commutation sequence is used to instruct the plurality of phase windings of the motor to enter a high potential mode, a low potential mode, and a floating mode, respectively; wherein, when one of the phase windings enters the floating mode from the low potential mode by instruction of the commutation sequence, the mode driving circuit indicates the phase winding that enters the floating mode from the low potential mode as a designated phase windings corresponding to the designated phase circuit; wherein, when the lower bridge switch driving signal output by the mode driving circuit indicates that the lower bridge switch of the designated phase circuit is switched from on to off, the feedback control signal is correspondingly output to instruct the control circuit to enter the feedback mode.

4. The three-phase motor driving circuit according to claim 2, wherein the control circuit directly controls the upper bridge switch and the lower bridge switch to be turned on or off according to the upper bridge switch driving signal and the lower bridge switch driving signal in the normal mode.

5. The three-phase motor driving circuit according to claim 2, wherein the commutation sequence is used to indicate that the output nodes of the plurality of phase circuits corresponding to the plurality of phase windings of the motor respectively enter a predicted source current state and a predicted sink current state in sequence.

6. The three-phase motor driving circuit according to claim 5, wherein, when one of the output nodes of the phase circuits enters the predicted source current state according to the instruction of the commutation sequence, the mode driving circuit indicates the phase circuit whose output node enters the predicted source current state as the designated phase circuit; wherein, when the lower bridge switch driving signal output by the mode driving circuit instructs the lower bridge switch of the designated phase circuit to be switched from on to off, the feedback control signal is correspondingly output to instruct the control circuit to enter the feedback mode.

7. The three-phase motor driving circuit according to claim 5, wherein, when one of the output nodes of the phase circuits makes the corresponding phase circuits to respectively enter the predicted source current state according to the instruction of the commutation sequence, the mode driving circuit indicates the phase circuit entering the predicted source current state as the designated phase circuit; wherein, when the lower bridge switch driving signal output by the mode driving circuit instructs the lower bridge switch of the designated phase circuit to be switched from on to off, the feedback control signal is correspondingly output to instruct the control circuit to enter the feedback mode, and when the feedback detection unit detects that the output current is 0 and outputs the lower bridge switch turn-off signal, an output of the feedback control signal is stopped to instruct the control circuit to return to the normal mode.

8. A three-phase motor driving method for a three-phase motor driving circuit and configured to drive a motor, the three-phase motor driving circuit including an inverter circuit, a control circuit, a turn-off module, and a turn-off confirmation module and a turn-on logic unit, wherein the inverter circuit includes a plurality of phase circuits respectively corresponding to a plurality of phase windings of the motor, and each of the phase circuits includes an upper bridge switch connected between a common voltage source and an output node and a lower bridge switch connected between the output node and a ground terminal, the three-phase motor driving method comprising:

configuring the control circuit to receive an upper bridge switch driving signal and a lower bridge switch driving signal and operate in a normal mode and a feedback mode, and to enter the feedback mode and output a feedback start signal in response to the control circuit receiving the lower bridge switch driving signal indicating that the lower bridge switch of a designated phase circuit among the plurality of phase circuits to be switched from on to off and a feedback control signal indicating that the control circuit to enter the feedback mode;

configuring a feedback detection unit of the turn-off module to, in response to receiving the feedback start signal, detect an output current of the output node of the designated phase circuit, wherein, if the output current is flowing to the upper bridge switch, the feedback detection unit is configured to output a voltage regulation signal to adjust a voltage of the output node to approach the predetermined voltage, and to output a lower bridge turn off signal when the output current stops flowing to the upper bridge switch;

configuring a voltage adjusting unit of the turn-off module to, in response to receiving the voltage adjusting signal, adjust the voltage of the output node to approach the predetermined voltage;

configuring a turn-off logic unit of the turn-off module to control the lower bridge switch to be turned off according to the lower bridge turn off signal in the feedback mode;

configuring the turn-off confirmation module to detect whether the lower bridge switch is turned off, and output, in response to detecting that the lower bridge switch is turned off, a lower bridge switch turn-off confirmation signal used to indicate allowing the control circuit to control the upper bridge switch to be turned on;

configuring the turn-on logic unit to control the lower bridge switch to be turned on according to a lower bridge switch turn-on signal; and configuring the control circuit to, in the feedback mode, control the upper bridge switch to be turned on according to the upper bridge switch driving signal in response to receiving the lower bridge switch turn-off confirmation signal.

9. The three-phase motor driving method according to claim 8, wherein the three-phase motor driving circuit further includes a mode driving circuit, and the three-phase motor driving method further comprises: configuring the mode driving circuit to output the upper bridge switch driving signal, the lower bridge switch driving signal and the feedback control signal according to a predetermined driving pattern; wherein the predetermined driving pattern has a commutation sequence for driving the plurality of phases of the motor.

10. The three-phase motor driving method according to claim 9, wherein the commutation sequence is used to instruct the phase windings of the motor to enter a high potential mode, a low potential mode, and a floating mode, respectively, and the three-phase motor driving method further comprises:

configuring the mode driving circuit to, in response to one of the phase windings entering the floating mode from the low potential mode according to an instruction of the commutation sequence, indicate the phase winding that enters the floating mode from the low potential mode as a designated phase corresponding to the designated phase circuit; and configuring the mode driving circuit to, in response to the lower bridge switch driving signal output by the mode driving circuit indicating that the lower bridge switch of the designated phase circuit is switched from on to off, correspondingly output the feedback control signal to indicate the control circuit to enter the feedback mode.

11. The three-phase motor driving method according to claim 9, further comprising configuring the control circuit to directly control the upper bridge switch and the lower bridge switch to be turned on or off according to the upper bridge switch driving signal and the lower bridge switch driving signal in the normal mode.

12. The three-phase motor driving method according to claim 9, wherein the commutation sequence is used to indicate that the output nodes of the plurality of phase circuits corresponding to the plurality of phase windings of the motor respectively enter a predicted source current state and a predicted sink current state in sequence.

13. The three-phase motor driving method according to claim 12, further comprising:

in response to one of the output nodes of the phase circuits entering the predicted source current state according to the instruction of the commutation sequence, configuring the mode driving circuit to indicate the phase circuit whose output node enters the predicted source current state as the designated phase circuit; and in response to the lower bridge switch driving signal output by the mode driving circuit instructing the lower bridge switch of the designated phase circuit to be switched from on to off, configuring the mode driving circuit to correspondingly output the feedback control signal to instruct the control circuit to enter the feedback mode.

14. The three-phase motor driving method according to claim 12, further comprising:

in response to one of the output nodes of the phase circuits making the corresponding phase circuits to respectively enter the predicted source current state according to the instruction of the commutation sequence, configuring the mode driving circuit to indicate the phase circuit whose output node enters the predicted source current state as the designated phase circuit; and in response to the lower bridge switch driving signal output by the mode driving circuit instructing the lower bridge switch of the designated phase circuit to be switched from on to off, configuring the mode driving circuit to correspondingly output the feedback control signal to instruct the control circuit to enter the feedback mode until the feedback detection unit detects that the output current is 0 and outputs the lower bridge switch turn-off signal, and then configuring the mode driving circuit to stop outputting the feedback control signal to instruct the control circuit to return to the normal mode.

\* \* \* \* \*